United States Patent
Hsieh (10) Patent No.: US 9,963,194 B2
(45) Date of Patent: May 8, 2018

(54) PEDAL FOR BICYCLE OR EXERCISE BIKE

(71) Applicant: Chin-Long Hsieh, Taichung (TW)

(72) Inventor: Chin-Long Hsieh, Taichung (TW)

( * ) Notice: Subject to any disclaimer, the term of this patent is extended or adjusted under 35 U.S.C. 154(b) by 0 days. days.

(21) Appl. No.: 15/219,299

(22) Filed: Jul. 26, 2016

(65) Prior Publication Data

US 2018/0015984 A1 Jan. 18, 2018

(30) Foreign Application Priority Data

Jul. 12, 2016 (TW) .............................. 105210460 U (51) Int. Cl.
*B62M 3/08* (2006.01)

(52) U.S. Cl.
CPC ............... *B62M 3/08* (2013.01); *B62M 3/086* (2013.01)

(58) Field of Classification Search
CPC ........ B62M 3/08; B62M 3/083; B62M 3/086; B62M 3/10; B62M 3/12; B62M 3/16
See application file for complete search history.

(56) References Cited

U.S. PATENT DOCUMENTS

| | | | | |
|---|---|---|---|---|
| 7,669,504 B2* | 3/2010 | Lin | ........................... | B62M 3/08 74/594.4 |
| 7,856,905 B2* | 12/2010 | Hsieh | ..................... | B62M 3/086 74/594.4 |
| 8,061,236 B2* | 11/2011 | French | ..................... | B62M 3/08 74/594.4 |
| 8,141,456 B2* | 3/2012 | Chen | ......................... | B62M 3/08 74/594.6 |
| 8,381,616 B2* | 2/2013 | Jessie, Jr. | ................. | B62M 3/08 74/594.4 |
| 9,003,921 B2* | 4/2015 | Weagle | ..................... | B62M 3/08 74/594.4 |
| 9,663,185 B2* | 5/2017 | Chen | ......................... | B62M 3/08 |
| 2009/0100961 A1* | 4/2009 | Hu | ............................. | B62M 3/08 74/560 |
| 2009/0241725 A1* | 10/2009 | Chen | ......................... | B62M 3/08 74/594.4 |
| 2012/0167711 A1* | 7/2012 | Hsieh | ...................... | B62M 3/086 74/594.6 |
| 2014/0090516 A1* | 4/2014 | Liang | ....................... | B62M 3/08 74/594.4 |
| 2017/0066499 A1* | 3/2017 | Yang | ....................... | B62M 3/086 |

* cited by examiner

*Primary Examiner* — Adam D Rogers (57) ABSTRACT

A pedal for a bicycle or an exercise bike contains: a body. The body includes a road-bike stepping assembly, a connection assembly, two positioning protrusions secured on two sides of the connection assembly, respectively, and a plurality of locking orifices defined on the connection assembly. The connection assembly is screwed with a mountain-bike stepping assembly by way of multiple screws, the mountain-bike stepping assembly includes two engaging trenches mating with the two positioning protrusions, individually, and the mountain-bike stepping assembly also includes a plurality of through apertures cooperating with the plurality of locking orifices, respectively. The connection assembly is screwed with a coupling plate by using the multiple screws, the coupling plate includes two retaining grooves mating with the two positioning protrusions, respectively, and the coupling plate also includes multiple openings cooperating with the plurality of locking orifices, respectively.

4 Claims, 9 Drawing Sheets

PEDAL FOR BICYCLE OR EXERCISE BIKE

FIELD OF THE INVENTION

The present invention relates to a pedal for a bicycle or an exercise bike which changes related components so as to satisfy various using requirements.

BACKGROUND OF THE INVENTION

A conventional pedal for a bicycle or an exercise bike contains two same operation surfaces which are applicable for a single purpose, so providing a pedal for multiple purposes is required.

The present invention has arisen to mitigate and/or obviate the afore-described disadvantages.

SUMMARY OF THE INVENTION

The primary objective of the present invention is to provide a pedal for a bicycle or an exercise bike which changes related components so as to satisfy various using requirements.

Another objective of the present invention is to provide a pedal for a bicycle or an exercise bike which enhances friction and anti-slip effect.

To obtain above-mentioned objectives, a pedal for a bicycle or an exercise bike provided by the present invention contains: a body. The body includes a road-bike stepping assembly mounted on one of two operation surfaces of the body, a connection assembly fixed on the other of the operation surfaces of the body, two positioning protrusions which are secured on two sides of the connection assembly, respectively, and a plurality of locking orifices defined on the connection assembly.

Preferably, the connection assembly is screwed with a mountain-bike stepping assembly by way of multiple screws, the mountain-bike stepping assembly includes two engaging trenches mating with the two positioning protrusions, individually, and the mountain-bike stepping assembly also includes a plurality of through apertures cooperating with the plurality of locking orifices, respectively.

Preferably, the connection assembly is screwed with a coupling plate by using the multiple screws, the coupling plate includes two retaining grooves mating with the two positioning protrusions, respectively, and the coupling plate also includes multiple openings cooperating with the plurality of locking orifices, respectively.

Preferably, the coupling plate includes multiple anti-slip bosses formed in any one of a rhombus shape, a circle shape, and a geometry shape.

Preferably, the connection assembly is screwed with multiple locking elements, and each of the locking elements has a screw extension and a nut.

Thereby, when the body is in connection with the road-bike stepping assembly, it is s applicable for a road bicycle, and when the body is in connection with the mountain-bike stepping assembly, it is used for a mountain bicycle. Preferably, the coupling plate is coupled with the body so as to be stepped by a sport shoe or a flat shoe. In addition, the coupling plate is removed from the body and the multiple locking elements replace the multiple screws so as to enhance friction and anti-slip effect of the pedal.

DETAILED DESCRIPTION OF THE PREFERRED EMBODIMENTS

With reference to FIGS. 1-5, a pedal for a bicycle or an exercise bike according to a preferred embodiment of the present invention includes a body 10 and a road bike pedaling assembly 20. The body 10 includes two operation surfaces and a spindle 11 for connecting a crank (not shown). A protrudent end with a thread of the spindle 11 is used for screwing into a crank, and the side of body 10 near the protrudent end of the spindle 11 or the crank is defined as an inner side and the other side is defined as an outer side. The road bike pedaling assembly 20 is mounted on one of two operation surfaces. A connection platform 30 is formed on the other of the operation surfaces. Two positioning protrusions 31, 32 are formed on two sides of the connection platform 30 in-line with an axial centerline of the spindle 11. Four locking orifices 33 are formed on the connection platform 30 near the positioning protrusions 31, 32.

Figure 1:
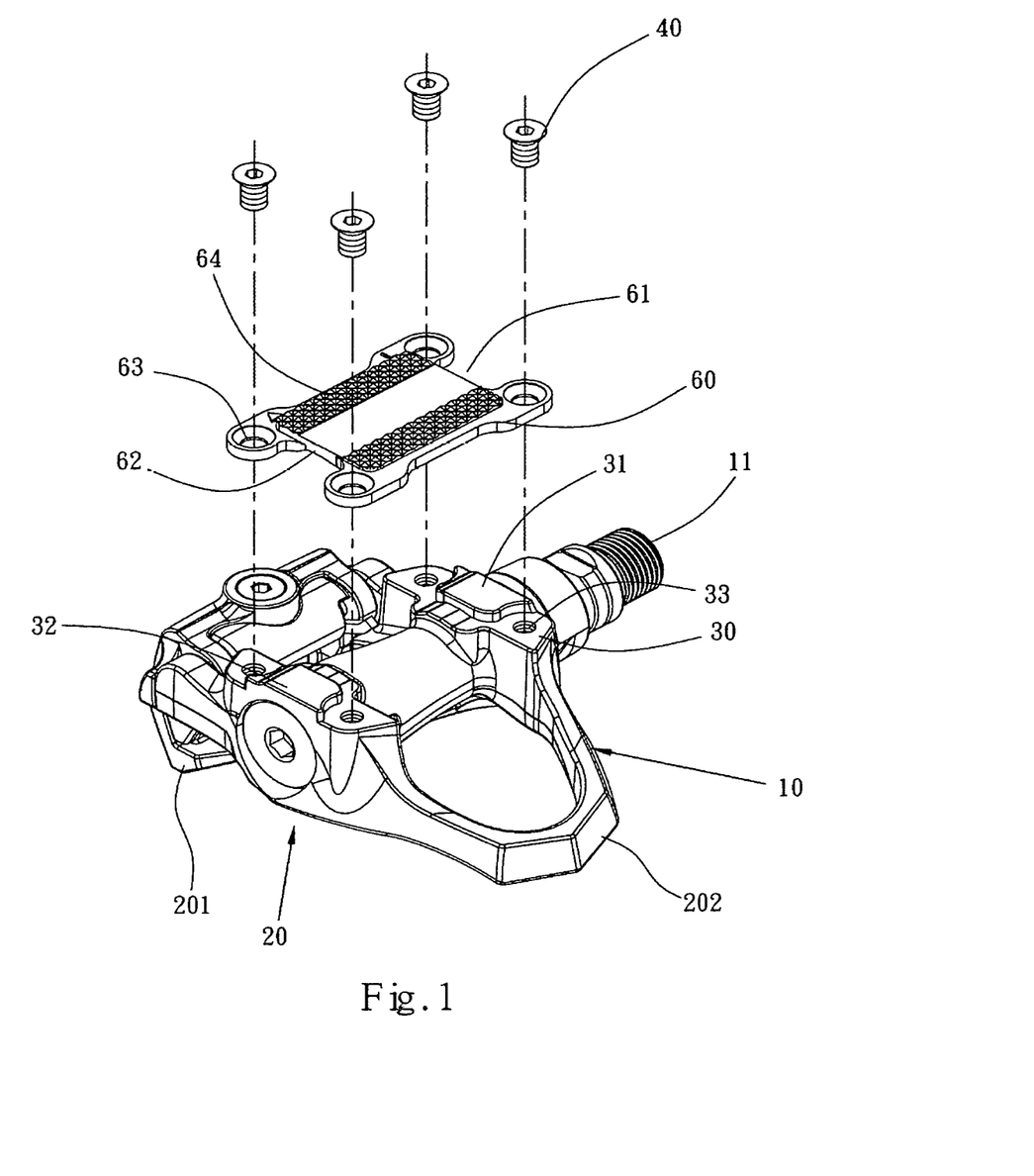
FIG. 1 is a perspective view showing the exploded components of a pedal for a bicycle or an exercise bike according to a preferred embodiment of the present invention.
Figure 2:
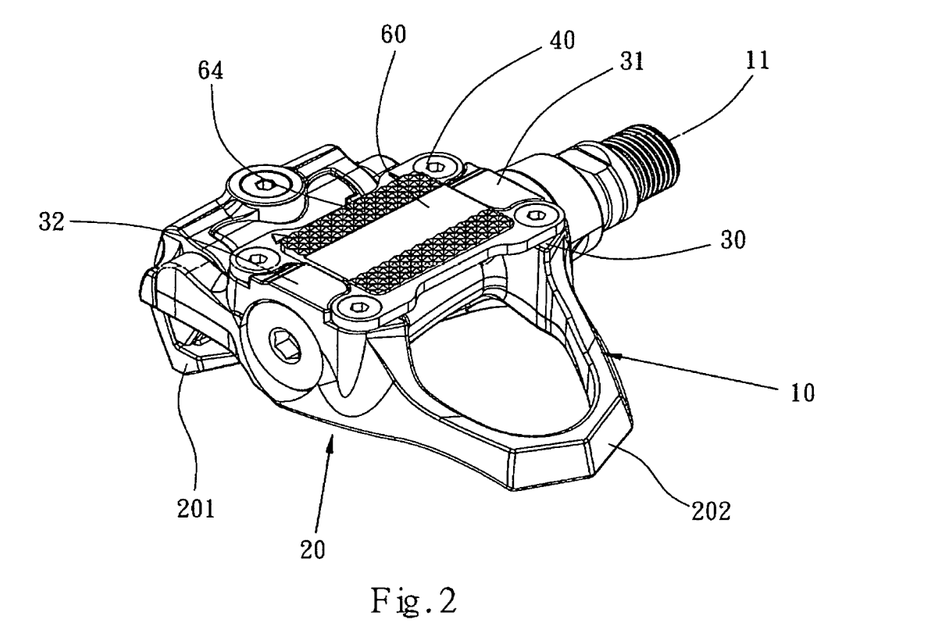
FIG. 2 is a perspective view showing the assembly of the pedal for the bicycle or the exercise bike according to the preferred embodiment of the present invention.
Figure 3:
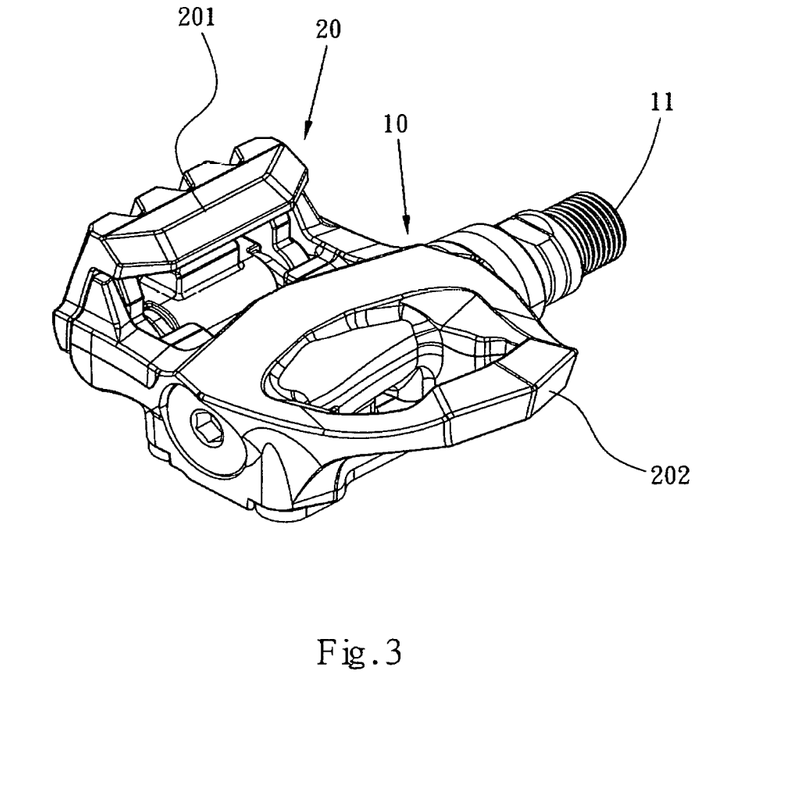
FIG. 3 is another perspective view showing the assembly of the pedal for the bicycle or the exercise bike according to the preferred embodiment of the present invention.

Please refer to FIG. 3. The road bike pedaling assembly 20 is used for locking onto a cleat (not shown) fitted to a sole. The road bike pedaling assembly 20 includes a first front clamping member 202 which is an arc forward extending from the body 10 and a first rear clamping member 201 which is a sprung hook rearward extending from and pivotally connected to the body 10.

Figure 6:
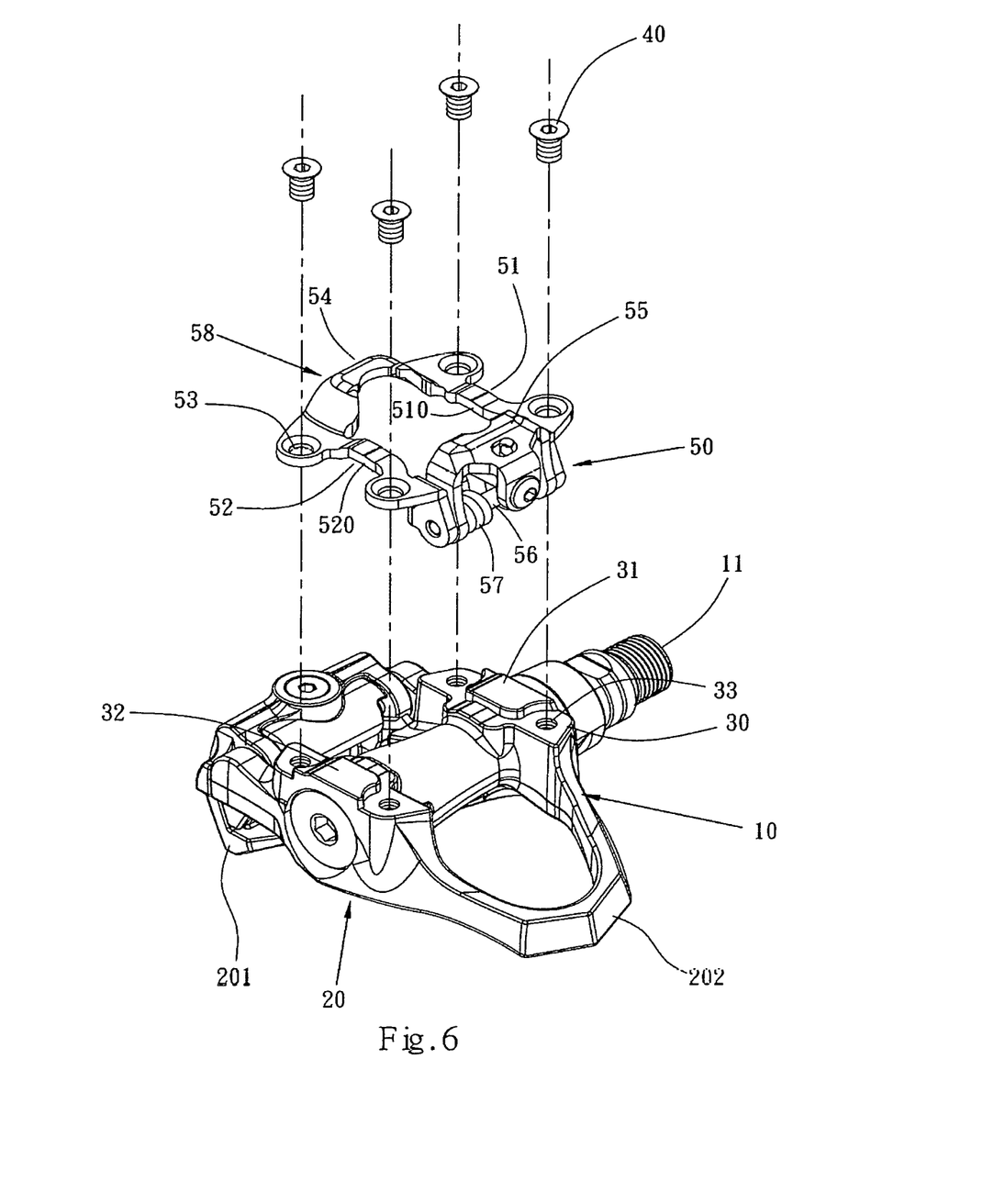
FIG. 6 is a perspective view showing the exploded components of a pedal for a bicycle or an exercise bike according to another preferred embodiment of the present invention.
Figure 7:
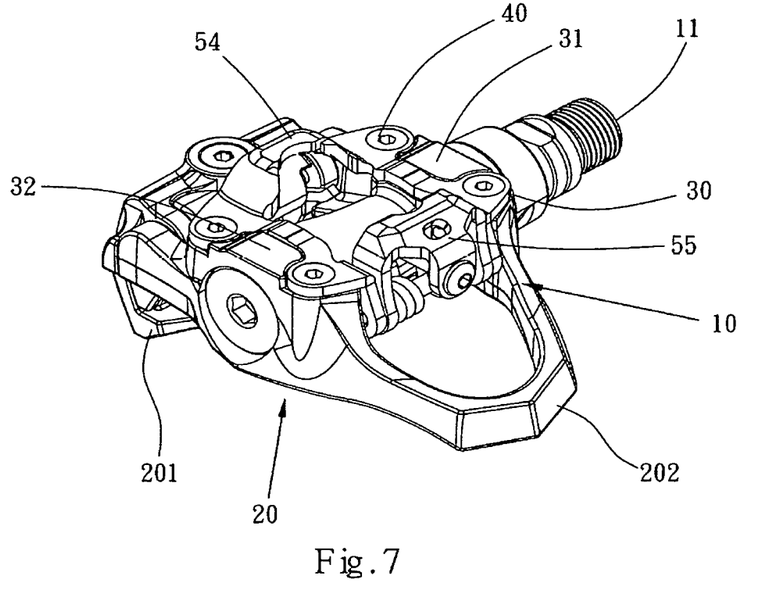
FIG. 7 is a perspective view showing the assembly of the pedal for the bicycle or the exercise bike according to said another preferred embodiment of the present invention.

Referring to FIGS. 6 and 7, a mountain-bike pedaling assembly 50 can be fastened on the connection platform 30 is by way of multiple screws 40. The mountain bike pedaling assembly 50 includes a C-shaped body 58 having two arms 510, 520 which are substantially parallel and an intermediate 54 connected between the two arms 510, 520. The intermediate 54 is upward arced to form a passageway serving as a second front clamping member. An engaging recess 51, 52 is formed on each of the arms 510, 520 for engaging with the two positioning protrusions 31, 32. Four through apertures 53 are formed in the C-shaped body and separately correspond to the four locking orifices 33 for being fastened onto the body 10 by the screws 40. A second rear clamping member 55 is pivotally connected between two ends of the C-shaped body 58 with a pivot pin 56 and a spring 57 around the pivot pin 56.

As shown in FIGS. 1, 2, 4 and 5, the connection platform 30 can be optionally fixed with a coupling plate 60 by using the multiple screws 40 when the mountain bike pedaling assembly 50 is not required. The coupling plate 60 includes two retaining indents 61, 62 for separately engaging with the two positioning protrusions 31, 32 and four openings 63 separately corresponding to the locking orifices 33.

Figure 4:
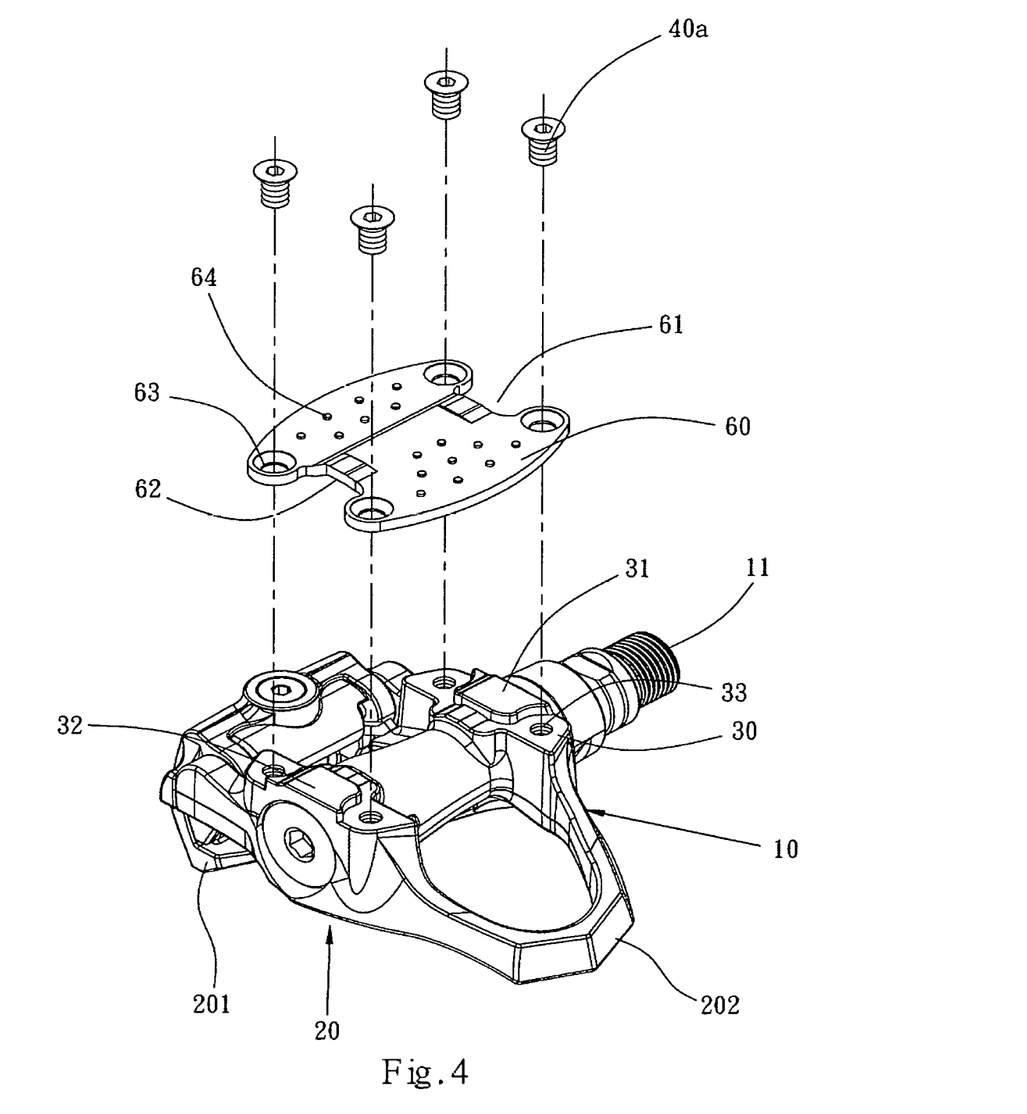
FIG. 4 is a perspective view showing the exploded components of a pedal for a bicycle or an exercise bike according to another preferred embodiment of the present invention.
Figure 5:
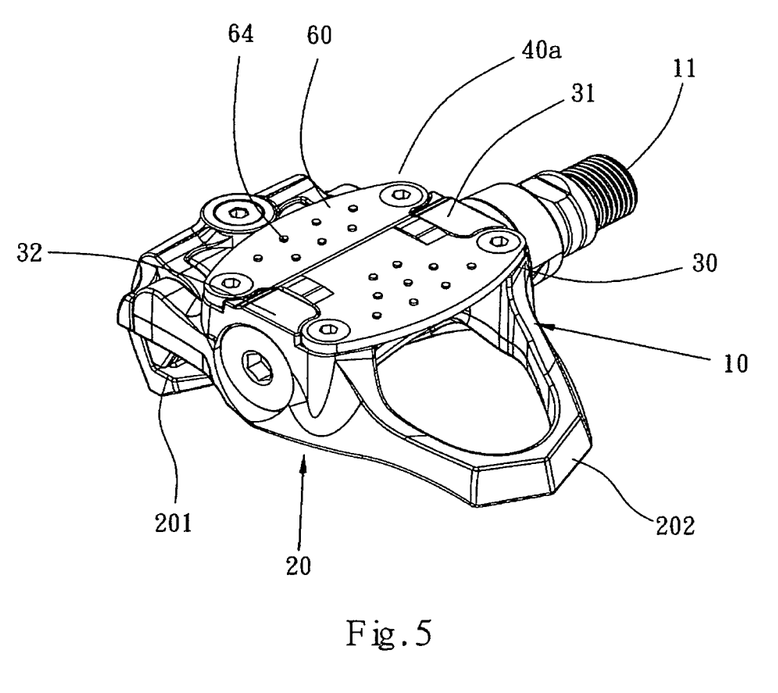
FIG. 5 is a perspective view showing the assembly of the pedal for the bicycle or the exercise bike according to said another preferred embodiment of the present invention.

Preferably, the coupling plate 60 can be formed with multiple anti-slip bosses 64.

Figure 8:
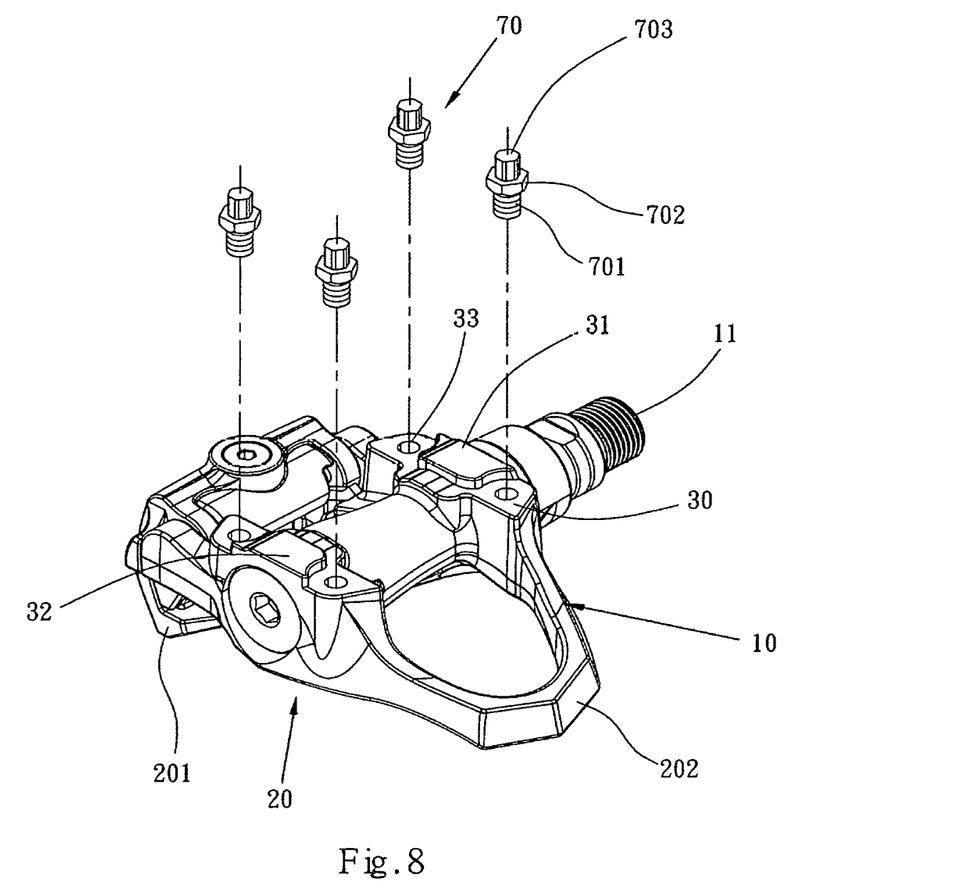
FIG. 8 is a perspective view showing the exploded components of a pedal for a bicycle or an exercise bike according to another preferred embodiment of the present invention.
Figure 9:
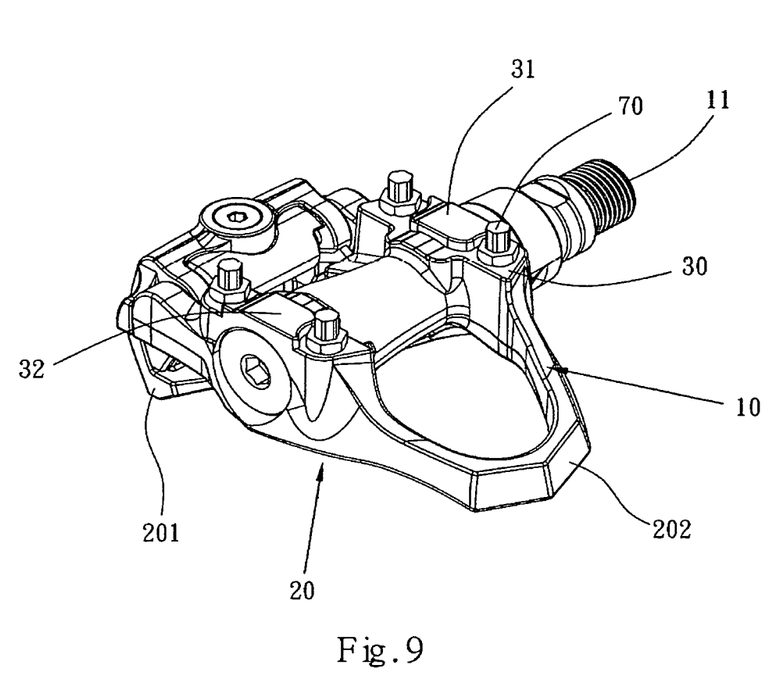
FIG. 9 is a perspective view showing the assembly of the pedal for the bicycle or the exercise bike according to said another preferred embodiment of the present invention.

Please refer to FIGS. 8 and 9. Optionally, the coupling plate 60 can be replaced with multiple locking elements 70. Each of the locking elements 70 has a rod with a thread portion 701 and a bar portion 703 and a nut 702 fixed between the thread portion 701 and the bar portion 703. The thread portion 701 can be screwed into one of the locking orifices 33.

In operation, the body 10 is in connection with the road bike pedaling assembly 20 so as to be applicable for a road bicycle, and the body 10 is in connection with the mountain bike pedaling assembly 50 so as to be applicable for a mountain bicycle. Preferably, the coupling plate 60 is coupled with the body 10 so as to be stepped by a sport shoe or a flat shoe. In addition, the coupling plate 60 is removable from the body 10 and the multiple locking elements 70 can replace the multiple screws 40 so as to enhance friction and anti-slip effect of the pedal.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A pedal for a bicycle or an exercise bike, comprising:
a body, including a spindle for connecting a crank, two operation surfaces separately connected on two sides of the spindle and a first pedaling assembly mounted on one of the two operation surfaces for locking onto a first cleat fitted to a sole of a user's shoe;
a connection platform formed on the other of the operation surfaces of the body, including two positioning protrusions which are formed on the connection platform in-line with an axial centerline of the spindle;
a second pedaling assembly mounted on the connection platform for locking onto a second cleat; and
a plurality of locking orifices formed in the connection platform around the positioning protrusions;
wherein the first pedaling assembly comprises:
a first front clamping member which is an arc extending forward from the body; and
a first rear clamping member which is a sprung hook extending rearward from and pivotally connected to the body;
wherein the second pedaling assembly comprises:
a C-shaped body having two arms which are substantially parallel and an intermediate part that extends between the two arms, the intermediate part is upward arced to form a second front clamping member;
two engaging recesses separately formed on one of the two arms for engaging with the two positioning protrusions;
a plurality of through apertures, formed in the C-shaped body, and separately corresponding to the plurality of locking orifices for being fastened onto the body by screws; and
a second rear clamping member which is pivotally connected between two ends of the C-shaped body with a pivot pin and a spring around the pivot pin.

2. A pedal for a bicycle or an exercise bike, comprising:
a body, including a spindle for connecting a crank, two operation surfaces on two sides of the spindle and a first pedaling assembly mounted on one of the two operation surfaces for locking onto a first cleat fitted to a sole of a user's shoe;
a connection platform formed on the other of the operation surfaces of the body, including two positioning protrusions which are formed on the connection platform in-line with an axial centerline of the spindle; and
a plurality of locking orifices formed in the connection platform around the positioning protrusions;
wherein the first pedaling assembly comprises:
a first front clamping member which is an arc extending forward from the body; and
a first rear clamping member which is a sprung hook extending rearward from and pivotally connected to the body;
wherein a coupling plate is mounted on the connection platform, the coupling plate is a flat plate with two retaining indents separately engaging with the two positioning protrusions, and the coupling plate also includes multiple openings separately corresponding to the plurality of locking orifices for being fastened by screws.

3. The pedal as claimed in claim 2, wherein the coupling plate includes multiple anti-slip bosses.

4. A pedal for a bicycle or an exercise bike, comprising:
a body, including a spindle for connecting a crank, two operation surfaces on two sides of the spindle and a first pedaling assembly mounted on one of the two operation surfaces for locking onto a first cleat fitted to a sole of a user's shoe;
a connection platform formed on the other of the operation surfaces of the body, including two positioning protrusions which are formed on the connection platform in-line with an axial centerline of the spindle; and
a plurality of locking orifices formed in the connection platform around the positioning protrusions;
wherein the first pedaling assembly comprises:
a first front clamping member which is an arc extending forward from the body; and
a first rear clamping member which is a sprung hook extending rearward from and pivotally connected to the body;
wherein a locking element is screwed into each of the locking orifices, and each of the locking elements has a rod with a thread portion and a bar portion and a nut fixed between the thread portion and the bar portion.

* * * * *